United States Patent [19]

Adams

[11] 4,206,827
[45] Jun. 10, 1980

[54] STEERING GEARS

[75] Inventor: Frederick J. Adams, Avon, England

[73] Assignee: Cam Gears Limited, Hertfordshire, England

[21] Appl. No.: 951,776

[22] Filed: Oct. 16, 1978

[30] Foreign Application Priority Data

Oct. 17, 1977 [GB] United Kingdom ............... 43063/77

[51] Int. Cl.² ............................................. B62D 5/08
[52] U.S. Cl. ......................................... 180/132; 91/51
[58] Field of Search ............... 180/132, 146, 147, 151, 180/143; 91/51, 431

[56] References Cited

U.S. PATENT DOCUMENTS

| | | | |
|---|---|---|---|
| 2,709,495 | 5/1955 | Vickers | 91/51 |
| 2,746,426 | 5/1956 | Gardiner | 91/378 |
| 3,160,071 | 12/1964 | Kandelman | 91/51 |
| 3,465,645 | 9/1969 | Mala | 91/51 |
| 3,645,167 | 2/1972 | Espenschied et al. | 91/51 |
| 3,973,640 | 8/1976 | Nishikawa et al. | 180/132 |

Primary Examiner—John J. Love
Assistant Examiner—Donn McGiehan

[57] ABSTRACT

A power assisted gear assembly in which a piston 3 forms with its cylinder opposed chambers 4, 5. Displacement of the piston provides a steering output and such displacement is effected by rotation of an input component 6 which screw threadedly engages the piston 3. Two fluid systems are provided with respective inlets 18, 20 and with the chambers 4, 5 being located one in each fluid system. A valve 10, 15, 16 adjusted by the input component 6 when displacing the piston 3 controls fluid flow through the two fluid systems to an outlet 29 and such valve has a neutral condition to which it is biased by springs 25, 26 or by fluid pressure in the fluid systems in which both fluid systems communicate with the outlet 29 for an open center system. The adjustable part 10 of the valve is in the form of an axially displaceable bearing for the component 6 or a circumferentially displaceable nut through which the piston 3 is driven from the component 6 and this adjustable part is adjusted from the neutral condition of the valve by rotation of the input component 6 and in response to the reaction from the force applied to displace the piston 3 so that such adjustment closes one or the other of the fluid systems, the fluid system which is closed being that in which is located the chamber 4, 5 which under fluid pressure provides assistance to displacement of the piston 3 in the same axial direction as that in which it is driven by rotation of the component 6.

There is also disclosed a steering system in which fluid pressure to the inlet ports 18, 20 is derived from the outlets 31, 34 of a flow divider 32.

25 Claims, 6 Drawing Figures

STEERING GEARS

This invention relates to steering gears and is particularly concerned with a power assisted steering gear assembly.

According to the present invention there is provided a power assisted steering gear assembly comprising a piston axially slidable in a piston cylinder and forming therewith opposed piston chambers, displacement of said piston being intended to provide or assist in a steering output; an input component coupled to the piston to effect axial displacement thereof when a steering input is applied to the input component; two fluid systems each of which has a fluid inlet, said piston chambers forming part of and being located one in each of the fluid systems; valve means associated with the input component and controlling fluid flow through the two fluid systems to an outlet of the assembly, said valve means having a neutral condition in which both fluid systems communicate with the outlet, and wherein said valve means is adjustable from its neutral condition upon the application of a steering input to the input component and in response to the reaction from the force applied to displace the piston, said adjustment of the valve means being such that it closes one or the other of the fluid systems to communication with the outlet, the particular fluid system which is closed being that in which is located the piston chamber which, when subjected to fluid pressure, provides assistance to displacement of the piston in the same axial direction as that effected by the steering input.

Further according to the present invention there is provided a steering system which includes a power assisted steering gear assembly as specified in the immediately preceding paragraph in which each of the two inlets communicate one with each of two sources of hydraulic fluid under pressure and the outlet communicates with a fluid reservoir.

Preferably the two sources of fluid pressure are derived from the outlets of a flow divider valve which is served by the output from a single hydraulic motor driven pump, convenient forms of flow divider valve being described in our British Patent Application No. 43062/77.

Alternatively each of the two inlets can communicate, one each, with the outlets from two motor driven hydraulic pumps drawing fluid from a common reservoir.

In the present invention the two fluid systems and valve means associated therewith can be considered as an open centre system whereby, in the absence of any steering manoeuvre, the valve means is in a neutral condition and fluid can flow freely through both fluid systems between the two inlets and the outlet. Upon a steering manoeuvre being effected the reaction caused by an adjustment of the input component and resultant force being applied to displace the piston is utilised to cause an adjustment in the valve means to displace the valve means from its neutral condition and in a sense which closes (preferably progressively) communication between the appropriate one or the other of the fluid system and the outlet. Upon any one fluid system being closed to communication with the outlet while the other fluid system maintains communication with the outlet, fluid pressure develops in the closed system and thereby in the piston chamber of that system so subjecting the piston to a pressure differential which assists in displacement of the piston in the same axial direction as that in which the piston is being displaced by the previously mentioned adjustment of the input component. To achieve the aforementioned pressure differential on the piston upon one of the fluid systems being closed to communication with the outlet it will be realised that the piston chamber in the particular fluid system which closes must communicate with the fluid pressure provided at the inlet port of that system and preferably each of the two piston chambers is in constant communication with the inlet of the respective fluid system of which it forms part.

Generally the input component will be intended to exhibit rotary motion upon the application of a steering input thereto so that, for example, the input component can be in the form of a pinion in a rack and pinion steering gear, a worm of a worm and roller gear or the cam of a cam and lever gear and as such the adjustment of the valve means can be either or both rotary (usually in the same direction as that in which the input component is rotated) or axial (that is in the direction of the axis about which the input component is rotated). In one form of construction the displaceable part of the valve means can be adjusted along the axis about which the input component is rotatable and that displaceable part can be fixed axially to the input component which latter is itself displaceable along the axis about which it rotates in response to the reaction applied thereto during rotation of the input component to axially displace the piston during a steering manoeuvre. In this particular form of construction the displaceable part of the valve means conveniently forms part of a bearing within which the input component is rotatably mounted in a housing of the assembly. In an alternative form of construction the displaceable part of the valve means can be adjusted circumferentially about the rotational axis of the input component so that upon rotation of the input component the displaceable valve part is rotatable to an extent which closes communication between the appropriate fluid system and the outlet port as a result of the torque which is transmitted to the displaceable component during rotation of the input component; for example, the displaceable component of the valve means can be in the form of a nut engaging with thread means on the input component which nut is free to exhibit partial rotation relative to another non-rotational valve component so that upon rotation of the input component in one direction or the other the nut of the valve means is partially rotated by the thread means relative to the non-rotary valve component to close the appropriate fluid system. In this latter form of construction the nut can be axially secured relative to the piston (conveniently located within the piston) and the piston can provide the non-rotatable valve component of the valve means so that upon rotation of the input component the nut exhibits partial rotation relative to the piston to adjust the valve means and upon continued rotation of the input component the nut is driven along the threaded portion of the input component to axially displace the piston (such displacement being assisted by the fluid pressure differential which is developed in the opposed piston chambers upon the rotation of the nut closing the appropriate fluid system to communication with the outlet).

In power assisted steering gears it is often considered desirable that a measure of "feel" is incorporated in the steering system to provide resistance to a steering manoeuvre which resistance increases progressively to oppose the force applied to the input component to effect the steering manoeuvre as the vehicle is steered progressively from the straight-ahead condition. Such feel can conveniently be provided in the present invention by subjecting the valve means directly to fluid pressure in the fluid system which such valve means is closing during a steering manoeuvre so that the valve means is itself subjected to a pressure differential which acts in a sense to oppose the force applied to displace the input component. By such an arrangement if the valve means progressively closes one or other of the fluid systems, the pressure differential to which the valve means is subjected can increase progressively to a maximum when the particular fluid system is fully closed. In addition, or alternatively, a measure of feel can be provided by spring loading or resiliently biasing the valve means to its neutral condition so that displacement of the valve means against its spring loading (and possibly also against fluid pressure) reacts through the input component in a sense to resist the steering manoeuvre which is applied thereto.

Embodiments of power assisted steering gear assemblies constructed in accordance with the present invention and incorporated in steering systems will now be described, by way of example only, with reference to the accompanying illustrative drawings in which.

Where possible throughout the following description the same parts or members in each of the Figures have been accorded the same references.

Figure 1:
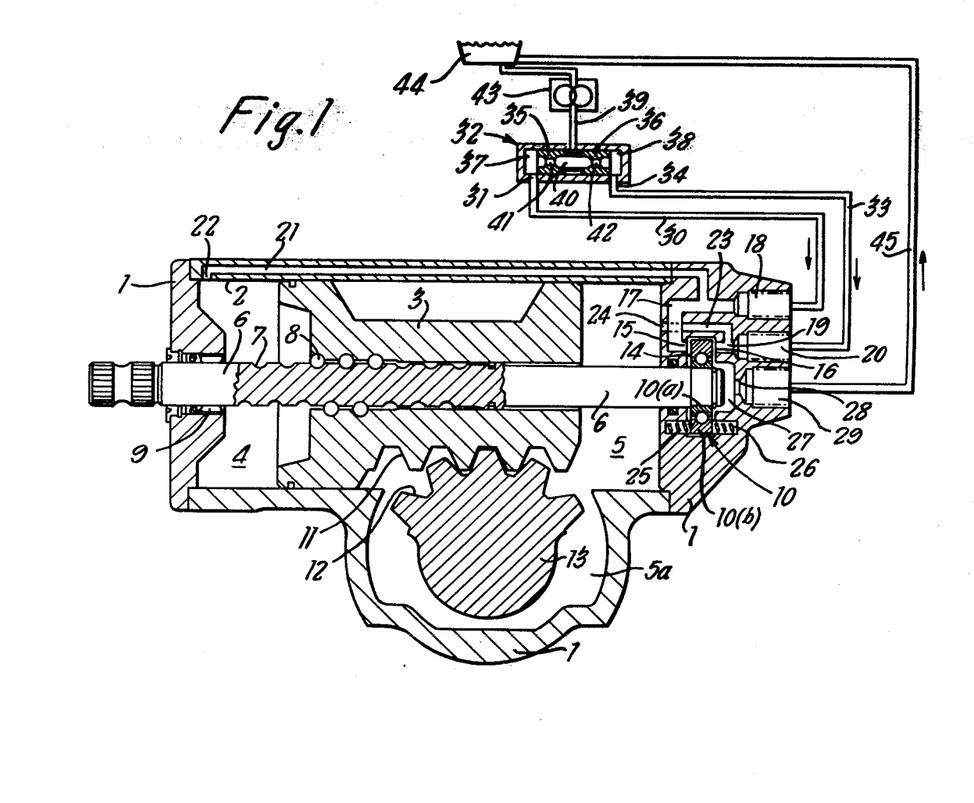
FIG. 1 shows a section through a first embodiment of steering gear in which the hydraulic system for such gear is shown schematically.

In the embodiment of FIG. 1 the steering gear assembly has a housing 1 defining a cylinder portion 2 within which is axially slidable a piston 3 which piston forms with its cylinder opposed piston chambers 4 and 5. Extending through the piston 3 and from the housing 1 is an input shaft 6 having a worm threaded portion 7 which engages with the piston 3 through a conventional recirculating ball gear 8. The shaft 6 is rotatably mounted in the housing 1 by a needle bearing assembly 9 and a ball bearing assembly 10 so that when, in use, the shaft 6 is coupled to and rotates in response to rotation of a steerable component, the piston 3 is driven through the ball gear 8 axially along its cylinder.

To provide a steering output in response to axial displacement of the piston 3 the latter is provided with a linear rack 11, the teeth of which engage with complementary teeth of a circumferential rack 12 on a rotor 13 which is conveniently housed in an extension 5a of the chamber 5 and is rotatably mounted in the housing 1. Rotational movement of the rotor 13 is transmitted in conventional manner through a steering linkage (for example by way of a drop arm) to steerable road wheels of a vehicle to which the gear may be fitted.

The bearings 9 and 10 substantially restrain radial displacement of the shaft 6 relative to the housing 1 and in addition the bearing 9 permits the shaft to slide axially relative to the housing 1 while the bearing assembly 10 is capable of restricted axial sliding movement in its seating in the housing 1 so that such bearing will follow axial displacement of the shaft 6. More particularly, the bearing assembly 10 has an inner race 10a which is mounted on a reduced diameter portion of the shaft 6 and is retained thereon by a circlip which restrains relative axial movement between the bearing assembly 10 and the shaft 6. The outer bearing race 10b of the assembly 10 is mounted in an annular recess 14 of the housing 1 to provide a predetermined amount of axial clearance and slight radial clearance as illustrated. Communicating with the annular recess 14 and located on axially opposite sides of the outer bearing race 10b are control ports 15 and 16 of which control port 15 communicates by way of a passage 17 with an inlet port 18 and control port 16 communicates by way of a passage 19 with a second inlet port 20. The passage 17, and thereby inlet port 18, is in constant communication by way of a branch passage 21 and port 22 with the piston chamber 4 while passage 19 and thereby inlet port 20 is in constant communication by way of branch passage 23 and port 24 with piston chamber 5.

As aforementioned, the shaft 6 and bearing assembly 10 are axially slidable relative to the housing 1 and axially opposed springs 25 and 26 are provided in blind bores in the housing 1 to react on axially opposite sides of the bearing race 10b to bias the bearing assembly 10 and thereby the shaft 6 to a neutral condition. In the neutral condition of the bearing race 10b the axially opposed side faces of such race are axially spaced (preferably equally) from both control ports 15 and 16 so that both of these ports communicate with a chamber 27 which is in constant communication by way of a passage 28 with an outlet port 29.

The steering gear as above described is incorporated in a steering system of a motor vehicle by connecting the inlet ports 18 and 20 one to each of two sources of hydraulic fluid under pressure and connecting the outlet port 29 to a fluid reservoir. In the example illustrated in FIG. 1 the inlet port 18 is connected by a conduit 30 with an outlet port 31 of a flow divider valve 32 while the inlet port 20 is connected through a conduit 33 with a further outlet port 34 of the valve 32. The valve 32 is of conventional form comprising a spool 35 which is axially slidable in a spool cylinder 36 to form therewith opposed spool chambers 37 and 38 which are respectively expanded and contracted alternately during axial reciprocation of the spool in its cylinder. The valve 32 has an inlet port 39 which is in constant communication by way of a central bore 40 in the spool with each of the spool chambers 37 and 38. Usually a flow restrictor 41 is provided between the chamber 37 and port 39 and a flow restrictor 42 is provided between the chamber 38 and inlet port 39. The spool 35 has a central condition in which both ports 31 and 34 communicate with the spool chambers 37 and 38 respectively and upon axial displacement of the spool from its central condition one or other of the ports 31 or 34 is progressively closed to communication with its associated spool chamber 37 or 38 respectively. The inlet port 39 communicates with the outlet of a motor driven hydraulic pump 43 drawing fluid from a reservoir 44. The outlet port 29 of the steering gear assembly communicates with the reservoir 44 by way of a conduit 45.

The steering gear assembly thus has two fluid systems which communicate with a common outlet port and are fed with fluid under pressure one from each of two separate fluid pressure sources. A first of these fluid systems is formed by the inlet port 18, passages 17 and 21, piston chamber 4, control port 15, annular recess 14, chamber 27, passage 28 and outlet port 29 while the second fluid system is formed by the inlet port 20, passages 19 and 23, piston chamber 5, control port 16, annular recess 14, chamber 27, passage 28 and outlet port 29.

In use of the steering gear shown in FIG. 1 it will be apparent that upon rotation of the input shaft 6 to effect a steering manoeuvre by driving the piston 3 axially in one or the other sense of direction through its cylinder 2, a reaction will be imparted to the shaft 6 in a sense to displace the shaft 6 axially relative to the housing 1 and in the opposite sense of direction from that in which the piston 3 is being driven. This axial displacement of the shaft 6 together with consequential displacement of the valve bearing assembly 10 carried by the shaft is utilised to control the flow of hydraulic fluid through the two fluid systems in a sense which creates a fluid pressure differential in the piston chambers 4 and 5 so that such pressure differential assists in moving the piston 3 in the same axial direction as that in which it is being driven by the shaft 6.

If it is assumed that the shaft 6 is rotated to drive the piston 3 rightwardly in FIG. 1, the reaction on the shaft 6 is such that it is displaced axially leftwardly in the drawing to displace bearing assembly 10 axially against the biasing of spring 25 and so that the side face of the outer bearing race 10b progressively closes control port 15 while control port 16 maintains communication with the outlet port 29. Upon control port 15 closing fluid pressure develops throughout the first fluid system upstream of such control port (which includes piston chamber 4) and also in passage 30 and spool chamber 37 while the second fluid system (which includes piston chamber 5) and also passage 33 and spool chamber 38 remains open to communication with the outlet port 29 and thereby reservoir 44. Consequently a hydraulic pressure differential is applied across the ends of the piston 3 which assists in driving the piston rightwardly through its cylinder in FIG. 1 to effect a steering manoeuvre.

While the piston 3 is subjected to a fluid pressure differential as aforementioned, the spool 35 is also subjected to a pressure differential. Upon control port 15 closing, fluid pressure develops in passage 30 and spool chamber 37 while spool chamber 38 is open to the outlet port 29 by way of the second fluid system. As a consequence the spool is displaced rightwardly from its central condition in FIG. 1 to progressively close port 34 while port 31 stays open to spool chamber 37. As a result of port 34 closing the pressure of the fluid at port 31 progressively increases so that the greater pressure is applied in the piston chamber 4 to assist the axial displacement of the piston 3.

Upon the steering manoeuvre being completed and the rotational torque on the shaft 6 ceasing, the spring 25 returns the bearing assembly 10 to its neutral condition so that control port 15 and the first fluid system upstream thereof together with spool chamber 37 are again opened to communication with the outlet port 29 causing fluid pressure to equalise in piston chambers 4 and 5 and in spool chambers 37 and 38 (whereupon the spool reverts to its central condition).

When the shaft 6 is rotated to drive the piston 3 leftwardly in FIG. 1 during a steering manoeuvre the reaction on the shaft displaces bearing assembly 10 from it neutral condition rightwardly in the drawing against the biasing of spring 26 to progressively close control port 16. It will be apparent that this has the opposite effect in the hydraulic system to that previously described whereby fluid pressure develops in the second fluid system upstream of the control port 16 to subject piston chamber 5 and spool chamber 38 to fluid pressure while piston chamber 4 and spool chamber 37 communicate with the outlet port 29. As a result the piston is subjected to a pressure differential which assists in displacing it leftwardly in the drawing while the spool is also subjected to pressure differential which displaces it in a sense to close port 31. When this latter steering manoeuvre has been completed the bearing assembly 10 reverts to its neutral condition to again open both fluid systems to communication with the outlet port and thereby equalise fluid pressure in the piston chambers while the spool reverts to its central condition.

From the aforegoing discussion it will be realised that axial displacement of the shaft 6 is against one or other of the springs 25 and 26 so that the biasing effect of one or other of these springs serves to resist such axial displacement and provide a degree of feel to a steering manoeuvre. In addition, as one or other of the control ports 15 and 16 is progressively closed the fluid pressure which develops in the fluid system upstream of the control port which is closing acts on the appropriate side face of the outer race of the assembly 10 to resist such closing movement and this provides a measure of feel to the steering manoeuvre which feel is progressive as pressure develops in the appropriate fluid system and may be determined by the area of the control ports 15 and 16; this latter fluid pressure on the race 10b also, of course, assists in returning the bearing assembly 10 to its neutral condition when a steering manoeuvre has been completed.

Figure 2:
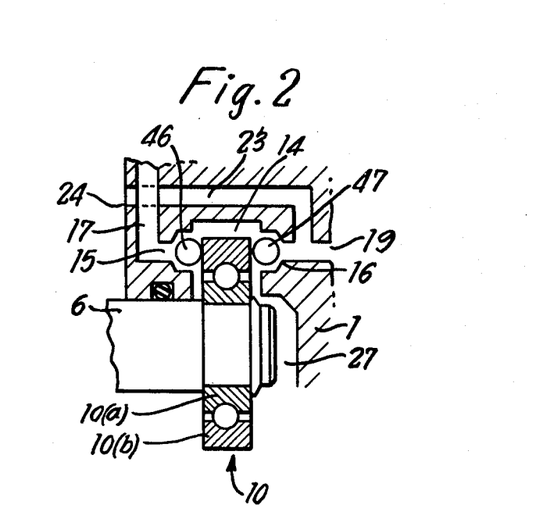
FIG. 2 shows a section through a modified form of valve mechanism suitable for use in the gear of FIG. 1.

In FIG. 1 the bearing assembly 10 and control ports 15 and 16 can be considered as forming an open centre valve and this valve can be modified as shown in FIG. 2 whereby the control ports 15 and 16 are controlled by balls 46 and 47 respectively which are seated in frusto conical recesses which open into the annular recess 14. Upon axial displacement of the bearing assembly 10 the appropriate ball 46 or 47 is displaced to progressively close the control port with which it is associated while the other control port remains open due to fluid pressure maintaining the ball associated therewith in contact with the outer race 10b.

Having in mind the axial pressure biasing effect and "feel" provided by fluid pressure acting on the valve assembly 10 from the control ports 15 and 16 (possibly through the balls 46 and 47), if required the springs 25 and 26 can be omitted.

Figure 3:
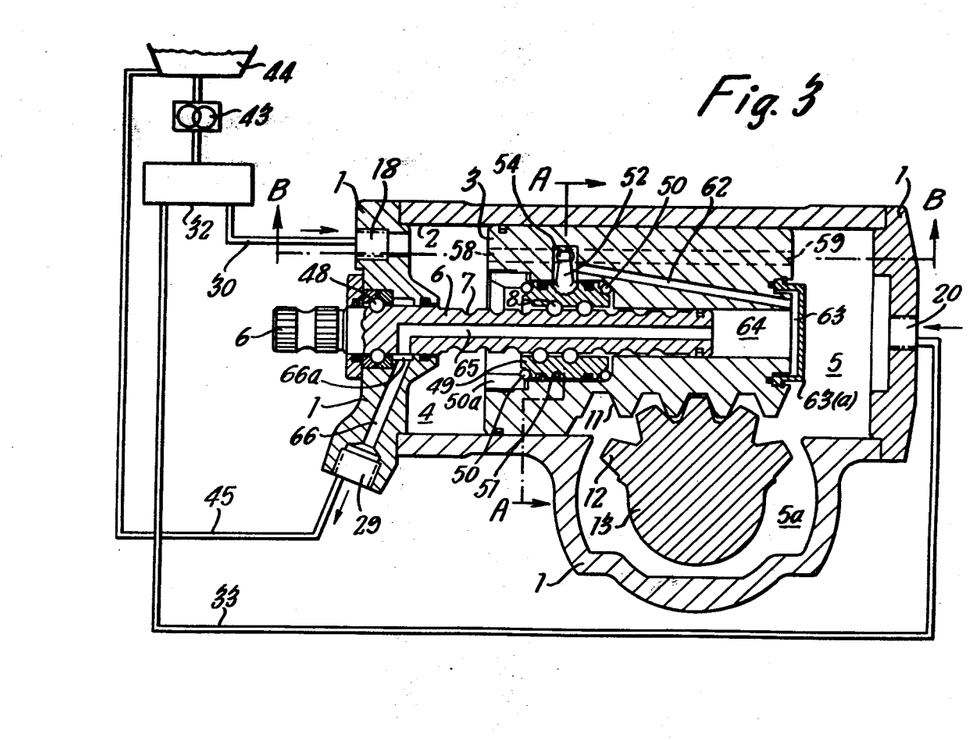
FIG. 3 shows a section through a further embodiment of steering gear in which the hydraulic system for such gear is shown schematically.
Figure 4:
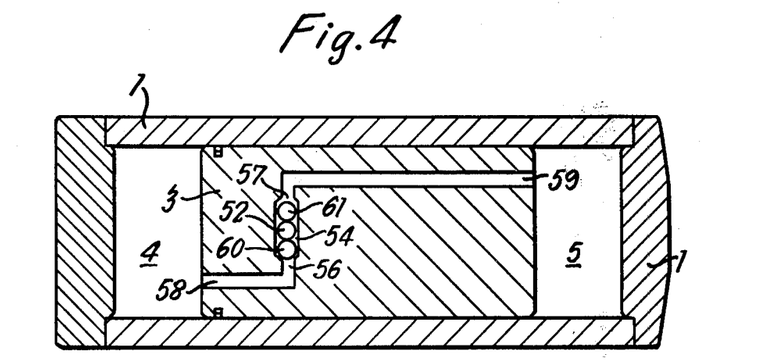
FIG. 4 is a section through the gear shown in FIG. 3 taken on the line B—B.
Figure 5:
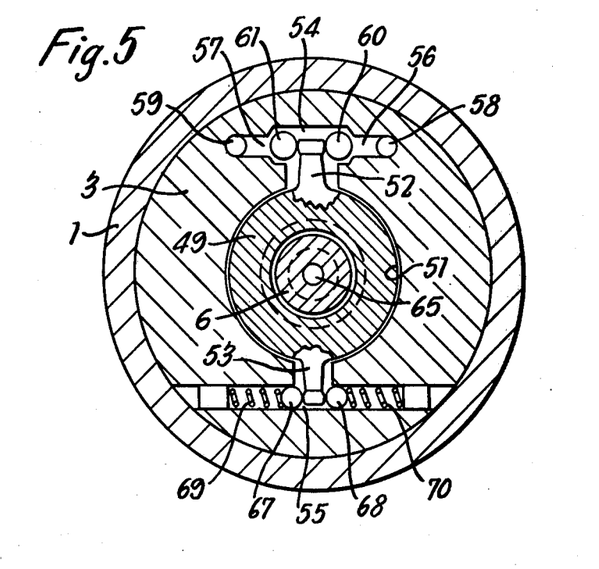
FIG. 5 is a section through the gear shown in FIG. 3 taken on the line A—A.

In the embodiment of FIGS. 3 to 5 the input shaft 6 is rotatably mounted in the housing 1 by a single row ball bearing assembly 48 which restrains both radial and axial displacement of the shaft relative to the housing. Similarly to the previous embodiment the piston 3 is driven axially through its cylinder 2 in response to a steering manoeuvre by a worm thread 7 and recirculating ball gear 8; however in the present embodiment the recirculating ball and worm provides engagement between the input shaft 6 and a nut 49. The nut 49 is received on the shaft 6 and is mounted within an annular recess 51 in the body of the piston 3 within which it is axially rotatable in bearings 50. The bearings 50 additionally serve to restrain relative axial displacement between the nut 49 and piston 3 and are retained together with the nut 49 in the recess 51 by an annular bearing block 50a which screw threadedly engages with the piston body 3. The nut 49 has a pair of radially outwardly extending bosses 52 and 53 which are located diametrically opposite to each other (see FIG. 5). The boss 52 projects into a valve chamber 54 in the piston 3 and the boss 53 projects into a spring chamber 55 in the piston 3. The bosses 52 and 53 are not necessarily in the same radial plane of the nut 49 and for convenience of illustration the boss 53 (and its associated components) has been omitted from FIG. 3.

Opening into the valve chamber 54 on opposite sides of the boss 52 and circumferentially spaced in the piston 3 are a pair of control ports 56 and 57 of which port 56 is in constant communication with piston chamber 4 by way of passage 58 and port 57 is in constant communication with piston chamber 5 by way of a passage 59. The control ports 56 and 57 are provided with frusto conical seats which receive ball valve members 60 and 61 respectively on opposite sides of the boss 52 (see FIG. 5). The valve chamber 54 is in constant communication with a passage 62 in the piston and this passage is in constant communication by way of a bridging chamber 63, bore 64 of the piston, an axially extending passage 65 in the shaft 6, and a passage 66 in the housing 1 with outlet port 29. The outlet port 29 communicates with the reservoir 44 by way of passage 45 and consequently valve chamber 54 is in constant communication with the reservoir 44. The bridging chamber 63 between passages 62 and 64 is conveniently formed by a cap 63a which is secured in sealed manner to the piston body 3. Communication between the passages 65 and 66 is maintained during relative rotation between the shaft 6 and housing 1 through an annular recess 66a in the housing.

Located in the spring chamber 55 are two balls 67 and 68 which are located on opposite sides of the boss 53 and are circumferentially spaced about the piston 3. The balls 67 and 68 are biased into abutment with the boss 53 by springs 69 and 70 in the spring chamber 55. The springs 69 and 70 (through their respective balls) bias the nut 49 circumferentially relative to the piston body 3 into a neutral condition in which the boss 52 is located substantially centrally in valve chamber 54 where both balls 60 and 61 permit communication between the control ports 56 and 57 and the valve chamber 54 and thereby communication between passages 58 and 59 and the outlet port 29.

Passage 30 from a first outlet of the divider valve 32 is in constant communication with piston chamber 4 through inlet port 18 and passage 33 from the second outlet of the divider valve 32 is in constant communication with the piston chamber 5 through inlet port 20. The steering gear assembly of FIGS. 3 to 5 therefore has two fluid systems a first of which is formed by inlet port 18, piston chamber 4, passage 58, control port 56, valve chamber 54 and passages 62 to 66 to the outlet port 29. The second fluid system is formed by inlet port 20, piston chamber 5, passage 59, control port 57, valve chamber 54 and passages 62 to 66 to the outlet port 29.

In use of the steering gear shown in FIGS. 3 to 5, and in the absence of a steering manoeuvre, hydraulic fluid from the pump 43 passes by way of divider valve 32 and inlet ports 18 and 20 into both piston chambers 4 and 5 and therefrom fluid flows substantially freely through the two fluid systems to return to the reservoir 44. The piston 3 is therefore not subjected to a fluid pressure differential and it will be apparent that fluid flow through the two systems urges the ball members 60 and 61 into abutment with the boss 52 to fully open the control ports 56 and 57.

When the shaft 6 is rotated in response to a steering manoeuvre such rotation of the shaft imparts a reaction to the nut 49 in a sense to rotate the nut with the shaft and relative to the piston body 3 against the biasing effect of one or the other of springs 69, 70 and to urge the appropriate ball valve member 60, 61 in a sense to close its associated control port. Assuming that the shaft 6 is rotated in a sense to drive the piston 3 rightwardly in FIG. 3, the reaction on the nut 49 causes the nut to rotate relative to the piston 3 and in a clockwise direction in FIG. 5 thereby compressing spring 69 and displacing ball member 60 to close control port 56. As control port 56 closes, and when it is closed, fluid pressure develops upstream of that control port in the fluid system of which it forms part so that hydraulic pressure increases in piston chamber 4. However control port 57 remains open to communication with the valve chamber 54 so that piston chamber 5 maintains its communication with the outlet port 29 and consequently the piston 3 is subjected to a pressure differential which assists in displacing the piston rightwardly in FIG. 3 and in the same direction as it is being driven by the shaft 6. When the shaft 6 ceases its rotation the biasing effect of spring 69 together with hydraulic pressure on the ball valve member 60 causes the nut 49 to rotate relative to the piston body 3 in an anti-clockwise direction in FIG. 5 until the boss 52 and balls 60, 61 attain their neutral condition and fluid pressure is equalised in both piston chambers 4 and 5. It will be apparent that if the shaft 6 is rotated to drive the piston 3 leftwardly in FIG. 3, the reaction on the nut 49 is such that the boss 52 displaces ball member 61 to close control port 57 (while spring 70 is compressed) and fluid pressure develops upstream of the control port 57 in the fluid system of which that port forms part and the piston is subjected to a pressure differential to displace it leftwardly in FIG. 3 and assist in the drive which is transmitted to the piston from the shaft 6. When the rotation of the shaft 6 ceases the biasing effect of spring 70 and fluid pressure on the ball member 61 causes the boss 52 to revert to its neutral condition. During the development of a pressure differential between the piston chambers 4 and 5 it will be realised that the divider valve 32 reacts in a similar manner to that previously described in the embodiment of FIGS. 1 and 2.

Figure 6:
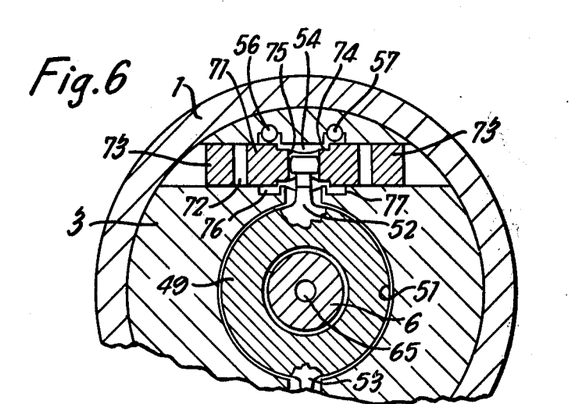
FIG. 6 shows a section similar to that of FIG. 5 through a modified form of valve mechanism suitable for use in the gear of FIGS. 3 to 5.

From the aforegoing description of FIGS. 3 to 5 it will be noted that the fluid pressure reaction on the ball members 60 and 61 is such as to bias the boss 52 to its neutral condition and so upon displacement of the boss 52 from its neutral condition feel is imparted to the steering manoeuvre to an extent which is substantially determined by the fluid pressure which develops in one or other of the piston chambers (such feel also being provided by the springs 69 and 70). If required, the gear in FIGS. 3 to 5 can be modified as shown in FIG. 6 in which the boss 52 is not biased into its neutral condition by fluid pressure at the control ports 56 and 57 and the sole means for locating the boss 52 in its neutral condition are the springs 69 and 70 which also serve to provide such feel as is necessary to oppose a steering manoeuvre. In FIG. 6 a spool 71 effectively replaces the ball members 60 and 61 and is axially slidable in a spool cylinder 72 which is conveniently formed by providing a bore hole through the piston body 3, such bore hole extending substantially tangentially with respect to the nut 49 and having its ends blocked by plugs 73 to form the spool cylinder. The spool 71 has an annular recess 74 which forms with the spool cylinder 72 the valve chamber 54 which is in constant communication with the outlet port 29 as previously discussed. The spool 71 is provided in its recessed portion with a diametrically extending through bore 75 which receives the boss 52. It will be seen from the drawing that the head of the boss 52 is of part spherical configuration and this head is received by the bore 75 in rocking and sliding relationship so that when the nut 49 is rotated relative to the piston body 3 the boss 52 will impart axial displacement to the spool 71 relative to its cylinder. The control ports 56 and 57 open into axially spaced annular recesses 76 and 77 respectively in the wall of the spool cylinder 72. With the boss 52 in its neutral condition both control ports 56 and 57 communicate through their respective recesses 76 and 77 with the valve chamber 54 and so both fluid systems are open to communication with the outlet port and the piston is not subjected to a fluid pressure differential. Upon rotation of the input shaft 6 during a steering manoeuvre the spool 71 will be displaced through its cylinder by the boss 52 and from its neutral condition to progressively close either control port 56 or control port 57 to communication with the valve chamber 54 so that hydraulic pressure in the fluid system which is upstream of the control port which is closed will increase to provide the appropriate pressure differential in the piston chambers 4 and 5 and thereby give the required power assistance to the steering manoeuvre. It will be noted that the control ports 56 and 57 in FIG. 6 are reversed in their positioning as compared with the arrangement shown in FIG. 5 to ensure that the appropriate control port is closed during relative rotation between the nut 49 and piston body 3 in the clockwise or anti-clockwise sense. Since hydraulic pressure from the control ports 56 and 57 is only applied radially to the spool 71 through the annular recesses 76 and 77, the spool 71 is not subjected to a fluid pressure differential which opposes relative circumferential displacement between the nut 49 and piston body 3 and therefore no hydraulic "feel" is fed back to the steering manoeuvre.

In a further modification (not shown) of the arrangement shown in FIG. 6 the boss 53 and its spring biasing are omitted and the spool 71 is spring biased to the neutral condition of the boss 52, for example by the location of springs between the axially opposed ends of the spool 71 and the plugs 73.

I claim:

1. A power-assisted gear assembly comprising a piston axially slidable in a piston cylinder and forming therewith opposed piston chambers, displacement of said piston being intended to provide or assist in a steering output;
   an output component coupled to the piston to effect axial displacement thereof when a steering input is applied to the input component;
   two fluid systems each of which has a fluid inlet, said piston chambers forming part of and being located one in each of the fluid systems;
   valve means associated with the input component and controlling fluid flow through the two fluid systems to an outlet of the assembly, said valve means having a neutral condition in which both fluid systems communicate with the outlet, and wherein said valve means is adjustable from its neutral condition upon the application of a steering input to the input component and in response to the reaction from the force applied to displace the piston, said adjustment of the valve means being such that it closes one or other of the fluid systems to communication with the outlet, the particular fluid system which is closed being that in which is located the piston chamber which, when subjected to fluid pressure, provides assistance to displacement of the piston in the same axial direction as that effected by the steering input, the input component exhibits rotary motion when a steering input is applied thereto and the valve means is adjusted in response to the reaction applied thereto by rotation of the input component to displace the piston.

2. An assembly as claimed in claim 1 in which the input component is coupled to the piston by way of screw means so that the piston is displaced axially through its cylinder by relative rotation between the piston and the input component, and wherein the valve means is adjusted in response to the reaction applied thereto by said relative rotation.

3. An assembly as claimed in claim 1 in which the valve means is adjusted in response to said reaction by displacement of a displaceable part of the valve means substantially in the same direction as the axis about which the input component is rotated.

4. An assembly as claimed in claim 3 in which the input component is displaceable in the direction of the axis about which it is rotatable and the displaceable part of the valve means is secured relative to the input component to be axially displaceable therewith in response to the reaction applied to the input component by relative rotation between the input component and the piston.

5. An assembly as claimed in claim 4 in which the displaceable part of the valve means forms part of a bearing by which the input component is rotatably mounted in a housing.

6. An assembly as claimed in claim 3 in which the displaceable part is biased in both directions of its axial displacement to a position corresponding to the neutral condition of the valve means.

7. A power-assisted gear assembly comprising a piston axially slidable in a piston cylinder and forming therewith opposed piston chambers, displacement of said piston being intended to provide or assist in a steering output;
   an input component coupled to the piston to effect axial displacement thereof when a steering input is applied to the input component;
   two fluid systems each of which has a fluid inlet, said piston chambers forming part of and being located one in each of the fluid systems;
   valve means associated with the input component and controlling fluid flow through the two fluid systems to an outlet of the assembly, said valve means having a neutral condition in which both fluid systems communicate with the outlet, and wherein said valve means is adjustable from its neutral condition upon the application of a steering input to the input component and in response to the reaction from the force applied to displace the piston, said adjustment of the valve means being such that it closes one or the other of the fluid systems to communication with the outlet, the particular fluid system which is closed being that in which is located the piston chamber which, when subjected to fluid pressure, provides assistance to displacement of the piston in the same axial direction as that effected by the steering input, the input component exhibiting rotary motion when a steering input is applied thereto and the valve means being adjusted in response to the reaction applied thereto by rotation of the input component to displace the piston, and by displacement of a displaceable part of the valve means substantially in the same direction as the axis about which the input component is rotated, the input component being displaceable in the direction of the axis about which it is rotatable, and the displaceable part of the valve means being secured relative to the input component to be axially displaceable therewith in response to the reaction applied to the input component by relative rotation between the input component and the piston, and said displaceable part controlling the opening and closing of two control ports which are located one in each of the two fluid systems so that when either one of said ports is closed by the displaceable part, the piston chamber associated with the fluid system having the control port which is closed can be subjected to fluid pressure from the fluid inlet of that system while the other control port remains open from the displaceable part and the piston chamber associated with the fluid system of that open control port communicates with the outlet.

8. An assembly as claimed in claim 7 wherein the displaceable part has two opposed side faces which are directed axially of the input component and control, one each, the opening and closing of the two control ports alternately when the displaceable part is displaced axially in alternate directions.

9. An assembly as claimed in claim 7 wherein the displaceable part controls the opening and closing of the control ports through ball valve members.

10. A power-assisted gear assembly comprising a piston axially slidable in a piston cylinder and forming therewith opposed piston chambers, displacement of said piston being intended to provide or assist in a steering output;

an input component coupled to the piston to effect axial displacement thereof when a steering input is applied to the input component;

two fluid systems each of which has a fluid inlet, said piston chambers forming part of and being located one in each of the fluid systems;

valve means associated with the input component and controlling fluid flow through the two fluid systems to an outlet of the assembly, said valve means having a neutral condition in which both fluid systems communicate with the outlet, and wherein said valve means is adjustable from its neutral condition upon the application of a steering input to the input component and in response to the reaction from the force applied to displace the piston, said adjustment of the valve means being such that it closes one or other of the fluid systems to communication with the outlet, the particular fluid system which is closed being that in which is located the piston chamber which, when subjected to fluid pressure, provides assistance of the piston in the same axial direction as that effected by the steering input, the input component exhibits rotary motion when a steering input is applied thereto and the valve means is adjusted in response to the reaction applied thereto by rotation of the input component to displace the piston and by displacement of a displaceable part of the valve means substantially circumferentially about the rotational axis of the input component so that upon rotation of the input component the displaceable part is rotatable to an extent which closes communication between the appropriate fluid system and the outlet port as a result of the torque which is transmitted to the displaceable component during rotation of the input component.

11. An assembly as claimed in claim 10 in which the displaceable part of the valve means is in the form of a nut engaging with thread means on the input component, said nut being free to exhibit partial rotation relative to another non-rotational valve component so that upon rotation of the input component in one direction or the other the nut is partially rotated by the thread means relative to the non-rotational valve component to close the appropriate fluid system.

12. An assembly as claimed in claim 11 in which the non-rotatable valve component is the piston.

13. An assembly as claimed in claim 12 in which the nut is axially secured relative to the piston so that upon rotation of the input component the nut exhibits partial rotation relative to the piston to adjust the valve means and upon continued rotation of the input component the nut is driven along the thread means of the input component to axially displace the piston.

14. An assembly as claimed in claim 12 in which the nut is located in a recess within the piston.

15. An assembly as claimed in claim 10 wherein the displaceable part controls the opening and closing of two control ports which are located one in each of the two fluid systems so that when either one of said ports is closed by the displaceable part the piston chamber associated with the fluid system having that control port which is closed can be subjected to fluid pressure from the inlet of that system while the other control port remains open from the displaceable part and the piston chamber associated with the fluid system of that open control port communicates with the outlet.

16. An assembly as claimed in claim 15 wherein the displaceable part has opposed circumferentially directed side faces which control, one each, the opening and closing of the two control ports alternately when the displaceable part is displaced circumferentially in alternate directions.

17. An assembly as claimed in claim 16 wherein the displaceable part controls the opening and closing of the control ports through ball valve members.

18. An assembly as claimed in claim 15 wherein the displaceable part engages with a spool through which it controls the opening and closing of the two control ports.

19. An assembly as claimed in claim 18 in which the spool is mounted to be slidable in a spool cylinder within the piston.

20. An assembly as claimed in claim 10 in which the displaceable part is biased in both directions of its circumferential displacement to a position corresponding to the neutral condition of the valve means.

21. An assembly as claimed in claim 12 in which the nut is circumferentially spring biased relative to the piston to the neutral condition of the valve means.

22. An assembly as claimed in claim 18 in which the spool is spring biased to urge the displaceable part to the neutral condition of the valve means.

23. A power-assisted gear assembly comprising a piston axially slidable in a piston cylinder and forming therewith opposed piston chambers, displacement of said piston being intended to provide or assist in a steering output;
- an input component coupled to the piston to effect axial displacement thereof when a steering input is applied to the input component;
- two fluid systems each of which has a fluid inlet, said piston chambers forming part of and being located one in each of the fluid systems;
- valve means associated with the input component and controlling fluid flow through the two fluid systems to an outlet of the assembly, said valve means having a neutral condition in which both fluid systems communicate with the outlet, and wherein said valve means is adjustable from its neutral condition upon the application of a steering input to the input component and in response to the reaction from the force applied to displace the piston, said adjustment of the valve means being such that it closes one or other of the fluid systems to communication with outlet, the particular fluid system which is closed being that in which is located the piston chamber which, when subjected to fluid pressure, provides assistance to displacement of the piston in the same axial direction as that effected by the steering input, the input component exhibits rotary motion when a steering input is applied thereto and the valve means is adjusted in response to the reaction applied thereto by rotation of the input component to displace the piston, and by displacement of a displaceable part of the valve means substantially in the same direction as the axis about which the input component is rotated, the input component being displaceable in the direction of the axis about which it is rotatable, and the displaceable part of the valve means being secured relative to the input component to be axially displaceable therewith in response to the reaction applied to the input component by relative rotation between the input component and the piston, the displaceable part of the valve means forming part of a bearing by which the input component is rotatably mounted in a housing, and the bearing being axially spring biased relative to the housing to bias the valve means to its neutral condition.

24. A power-assisted gear assembly comprising a piston axially slidable in a piston cylinder and forming therewith opposed piston chambers, displacement of said piston being intended to provide or assist in a steering output;
- an input component coupled to the piston to effect axial displacement thereof when a steering input is applied to the input component;
- two fluid systems each of which has a fluid inlet, said piston chambers forming part of and being located one in each of the fluid systems;
- valve means associated with the input component and controlling fluid flow through the two fluid systems to an outlet of the assembly, said valve means having a neutral condition in which both fluid systems communicate with the outlet, and wherein said valve means is adjustable from its neutral condition upon the application of a steering input to the input component and in response to the reaction from the force applied to displace the piston, said adjustment of the valve means being such that it closes one or other of the fluid systems to communication with the outlet, the particular fluid system which is closed being that in which is located the piston chamber which, when subjected to fluid pressure, provides assistance to displacement of the piston in the same axial direction as that effected by the steering input, said piston drivingly engaging a component which is rotatably displaceable to provide the steering output.

25. A power-assisted gear assembly comprising a piston axially slidable in a piston cylinder and forming therewith opposed piston chambers, displacement of said piston being intended to provide or assist in a steering output;
- an input component coupled to the piston to effect axial displacement thereof when a steering input is applied to the input component;
- two fluid systems each of which has a fluid inlet, said piston chambers forming part of and being located one in each of the fluid systems;
- valve means associated with the input component and controlling fluid flow through the two fluid systems to an outlet of the assembly, said valve means having a neutral condition in which both fluid systems communicate with the outlet, and wherein said valve means is adjustable from its neutral condition upon the application of a steering input to the input component and in response to the reaction from the force applied to displace the piston, said adjustment of the valve means being such that it closes one or other of the fluid systems to communication with the outlet, the particular fluid system which is closed being that in which is located the piston chamber which, when subjected to fluid pressure, provides assistance to displacement of the piston in the same axial direction as that effected by the steering input,
- each of said two fluid inlets communicating one with each of two sources of hydraulic fluid under pressure and the outlet communicating with a fluid reservoir, the two sources of fluid pressure being derived from the outlets of a flow divider valve which is served by the output from a single hydraulic motor driven pump.

* * * * *

UNITED STATES PATENT AND TRADEMARK OFFICE
CERTIFICATE OF CORRECTION

PATENT NO. : 4,206,827

DATED : June 10, 1980

INVENTOR(S) : Frederick John Adams

It is certified that error appears in the above-identified patent and that said Letters Patent are hereby corrected as shown below:

Column 9, line 59, change "output" to --input--.

Signed and Sealed this

Twenty-eighth Day of October 1980

[SEAL]

Attest:

SIDNEY A. DIAMOND

Attesting Officer

Commissioner of Patents and Trademarks